P. B. HARRISON.
ADJUSTABLE BRAKE HEAD.
APPLICATION FILED NOV. 22, 1911.
1,059,360.
Patented Apr. 22, 1913.
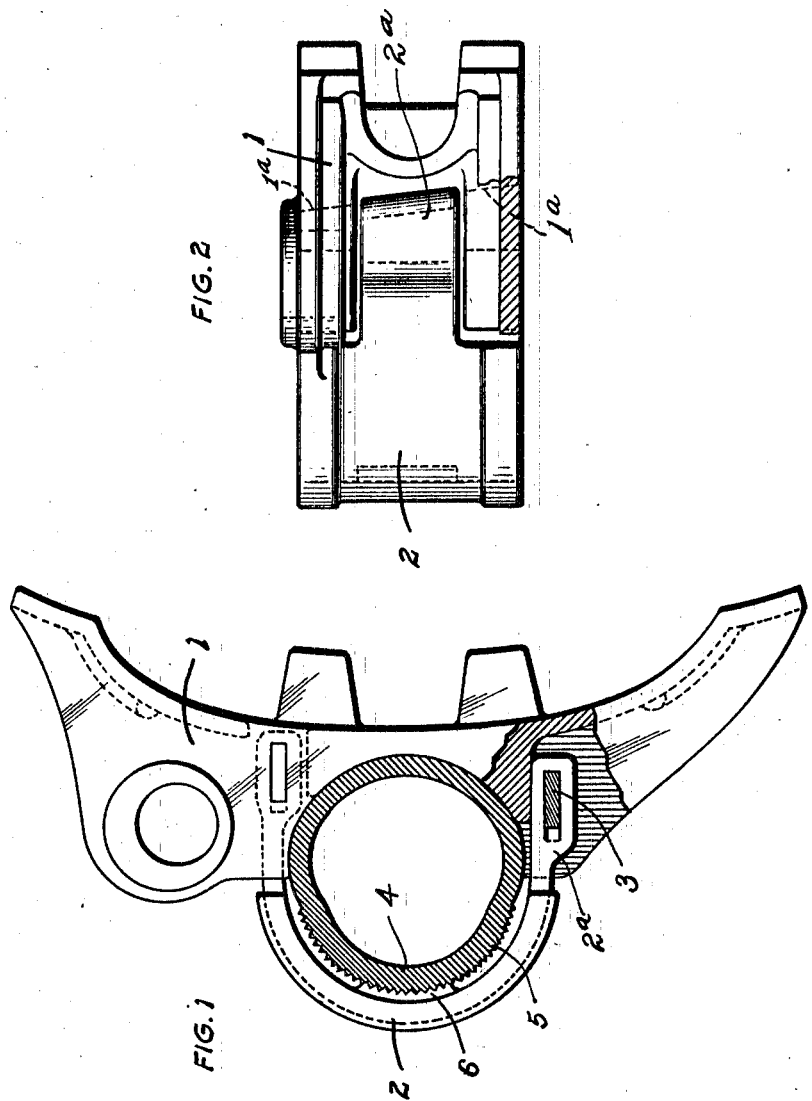
WITNESSES
INVENTOR
PHILIP B. HARRISON
BY ATT'Y.

UNITED STATES PATENT OFFICE.

PHILIP B. HARRISON, OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE BRAKE-HEAD.

1,059,360.   Specification of Letters Patent.   Patented Apr. 22, 1913.

Application filed November 22, 1911. Serial No. 661,828.

*To all whom it may concern:*

Be it known that I, PHILIP B. HARRISON, a citizen of the United States, residing at Chicago, Illinois, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1 is a side elevational view partly in section of my improved adjustable brake head. Fig. 2 is a top plan view of the same.

This invention relates to a new and useful improvement in adjustable brake heads, the object being to construct a brake head with comparatively few number of parts, the entire rear wall of which is removable whereby the head can be assembled on the part of the beam upon which it is mounted by a lateral movement and without requiring that the head be slipped longitudinally over the end of the beam. The rear wall is in the form of a strap separable from the brake head, each end of which strap coöperates with means whereby the strap is drawn inwardly toward the head to clamp the head in adjusted position.

In the drawings: 1 indicates the brake head, the rear wall of which is cut away.

2 is a strap forming the rear wall, said strap preferably having narrowed tongue portions 2ª at each end provided with openings for wedge keys 3. These wedge keys pass through suitable openings in flanges 1ª in the head and when the parts are assembled on the brake beam and the head adjusted to its proper position, the wedge keys are driven home drawing the strap inwardly toward the head and clamping the head to the beam 4. The smaller ends of the wedge keys may be then bent down to prevent accidental displacement thereof.

It is obvious that instead of having two wedge keys one at each end of the strap, the strap may be pivotally secured to the head at one end and provided with a wedge key at its other end. The back of the brake head is provided with a semi-circular recess in which the cylindrical portion of the beam is seated, the strap being U-shape and embracing the cylindrical portion of the beam. The cylindrical portion of the beam, as is usual with so-called adjustable brake heads, is provided with a groove in its rear wall in the bottom of which are arranged serrations 5 for coöperating with a projection 6 having a serrated face constituting a locking surface, said projection extending forwardly from the strap and coöperating with serrations 5 of the beam. In this manner the brake head can adjust itself to the wheel when the brakes are applied while the wedge keys are loose, after which the wedge keys may be driven home and their smaller ends bent over so as to rigidly lock the adjusted brake heads in proper position.

What I claim is:

1. A brake head having a semi-circular recess in its back for receiving a cylindrical part of the brake beam on which said head is mounted, a transversely extending movable part embracing the brake beam and having locking engagement with the cylindrical portion of the beam, and means coöperating with each end of said movable part to draw the same forwardly and inwardly to take up wear.

2. A brake head having a removable rear wall provided with a locking surface for engagement with the beam and a wedge key coöperating with one end of said wall and the brake head for drawing said wall toward the brake head.

3. A brake head having a removable rear wall and wedge keys coöperating with each end of said wall for drawing the same toward the brake head.

4. A brake head having a seat for a brake beam in its rear face, a strap embracing the brake beam, said strap having reduced ends and means coöperating with said reduced ends for drawing the strap toward the brake head and clamping the beam in position so as to take up wear and prevent rattling of the parts.

In testimony whereof I hereunto affix my signature in the presence of two witnesses, this 17 day of November, 1911.

PHILIP B. HARRISON.

Witnesses:
EDW. T. WALKER,
M. F. HUNTOON.

Copies of this patent may be obtained for five cents each, by addressing the "Commissioner of Patents, Washington, D. C."